US006574829B1

United States Patent
Marcum et al.

(10) Patent No.: US 6,574,829 B1
(45) Date of Patent: Jun. 10, 2003

(54) LEAF RECEPTACLE LID

(76) Inventors: Hubert W. Marcum, 2639 S. 35th St., Decatur, IL (US) 62521; Stephen M. DeVore, 2578 Redlich Ct., Decatur, IL (US) 62521

( * ) Notice: Subject to any disclaimer, the term of this patent is extended or adjusted under 35 U.S.C. 154(b) by 0 days.

(21) Appl. No.: 10/045,480

(22) Filed: Nov. 6, 2001

Related U.S. Application Data

(60) Provisional application No. 60/252,344, filed on Nov. 20, 2000.

(51) Int. Cl.[7] ............................ A47L 9/10; A47L 9/20
(52) U.S. Cl. ............................ 15/347; 15/352; 55/374; 55/493; 55/DIG. 2; 55/DIG. 3
(58) Field of Search ..................... 15/347, 352; 55/374, 55/376, 493

(56) References Cited

U.S. PATENT DOCUMENTS

| | | | | |
|---|---|---|---|---|
| 3,199,277 A | * | 8/1965 | Moody | 15/347 |
| 3,426,510 A | * | 2/1969 | Schaaf | 15/327.1 |
| 3,460,185 A | * | 8/1969 | Cook | 15/340.1 |
| 3,624,989 A | * | 12/1971 | Gatheridge | 15/347 |
| 3,903,565 A | * | 9/1975 | Hicks | 15/339 |
| 4,567,623 A | * | 2/1986 | Walton | 15/337 |
| 4,713,858 A | | 12/1987 | Kelber | |
| 4,941,231 A | * | 7/1990 | Jarosak | 15/328 |
| 6,178,592 B1 | * | 1/2001 | Whitney | 15/339 |

* cited by examiner

Primary Examiner—Chris K. Moore
(74) Attorney, Agent, or Firm—Philip L. Bateman

(57) ABSTRACT

A leaf receptacle lid attaches to a hand-held portable lawn blower/vacuum having an inlet for drawing air and leaves into the blower/vacuum and having a hose outlet for discharging the air and leaves. The lid contains a vertical chute and an overhanging horizontal lip. The chute is adapted to hold a flexible leaf receptacle and the overhanging lip is adapted to rest upon a support. The lid also contains a hinged door having an opening connected to the frame. The lid further contains a porous conduit having an inlet adapted to removably connect to the hose outlet of the blower/vacuum and having an outlet that communicates with the opening in the door.

12 Claims, 2 Drawing Sheets

LEAF RECEPTACLE LID

CROSS-REFERENCE TO RELATED APPLICATION

This application claims the benefit of U.S. Provisional Application Ser. No. 60/252,344, filed Nov. 20, 2000.

FIELD OF THE INVENTION

This invention relates to the collection of leaves and other yard debris into receptacles, such as bags and cans. More particularly, this invention relates to leaf collection devices that are used with lawn blower/vacuums.

BACKGROUND OF THE INVENTION

Leaves and other yard debris are commonly collected in receptacles, such as bags and cans, for disposal. One method of collection is to rake the leaves into a pile and then load them by hand into the receptacle. Although this method is slow and laborious, it is probably the most common. A less laborious method is to use a hand-held portable lawn blower/vacuum. These devices are powered by electrical motors or gasoline engines and contain an impeller, a suction inlet, and an outlet. When operated as a vacuum, a small pouch is attached to the discharge end of the outlet tube to collect the material being vacuumed. When collecting leaves, a lawn blower/vacuum is first used as a blower to blow the leaves into a pile and then as a vacuum to transfer the leaves into the small pouch. When the pouch is filled, it is emptied into a larger bag or can. Unfortunately, the pouch is generally small and must be emptied frequently. Furthermore, transferring the leaves from the pouch to a larger bag or can is difficult and often requires the assistance of a second person.

Kelber, U.S. Pat. No. 4,713,858, issued Dec. 22, 1987, incorporated herein by reference, discloses a leaf collection apparatus for hand-held portable lawn blower/vacuums. The apparatus includes a shroud that fits over, and completely covers, the top of a rigid can. The outlet from the lawn blower/vacuum is connected to a flexible tube, the tube is connected to the shroud, the shroud is secured to the can with a drawstring, and the leaves are discharged directly into the can. This eliminates the step of transferring leaves from the pouch into a bag or a can. The Kelber apparatus is a significant time saver, but suffers from several disadvantages. First, the entire air flow from the vacuum is discharged into the can. Although the shroud is perforated to allow air to escape, the pressure and turbulence inside the can is still very high. As a result, a large amount of dust is generated. As another result, bags cannot be filled unless they are inside a rigid can and bags made of paper must be altered to fit properly inside most cans. In other words, a rigid can is indispensable for using the Kelber apparatus.

Another disadvantage of the Kelber apparatus is that the apparatus must be disconnected from, lifted off, lifted back on, and then reconnected to the can every time access to the leaves is needed. This makes it difficult for people to compress the leaves in the can so that more leaves can be added. It also makes it difficult for people to add twigs or other large debris that cannot pass through the blower/vacuum to the can. It also means that, when filling bags, every filled bag (weighing up to about 40 pounds) must be lifted vertically two to three feet for removal from the can. A further disadvantage of the Kelber apparatus is that the shroud is susceptible to malfunctions such as twisting (which creates clogs) and being pulled or blown off the collecting can.

Accordingly, a demand exists for a leaf collection apparatus that reduces the pressure and turbulence in the collection vessel so that leaves are easily deposited into any type of receptacle, that allows for easy access to the leaves, that enables a bag to be easily removed from the apparatus without lifting, and that eliminates malfunctions caused by a flexible shroud.

SUMMARY OF THE INVENTION

The general object of this invention is to provide an improved leaf collection apparatus. More particular objects are to provide a leaf collection apparatus that reduces the pressure and turbulence in the collection vessel so that leaves are easily deposited into any type of receptacle, that allows for easy access to the leaves, that enables a bag to be easily removed from the apparatus without lifting, and that eliminates malfunctions caused by a flexible shroud.

We have invented a leaf receptacle lid for attachment to a hand-held portable lawn blower/vacuum having an inlet for drawing air and leaves into the blower/vacuum and having a hose outlet for discharging the air and leaves. The lid comprises: (a) an open frame having a vertical chute and an overhanging horizontal lip, the chute adapted to hold a flexible leaf receptacle and the overhanging lip adapted to rest upon a support; (b) a hinged door connected to the frame, the door having an opening that communicates with the chute; and (c) a porous conduit having an inlet adapted to removably connect to a hose outlet of a blower/vacuum and having an outlet that communicates with the opening in the door. The conduit runs parallel to the door and bends at a right angle into the door opening so that a portion of the air entering the conduit passes out the conduit before entering the leaf receptacle.

The leaf receptacle lid of this invention reduces the pressure and turbulence in the receptacle so that leaves are easily deposited into any type of receptacle. The lid also allows for easy access to the leaves and enables a bag to be easily removed from the apparatus without lifting. The lid also eliminates malfunctions caused by a flexible shroud.

DETAILED DESCRIPTION OF THE INVENTION

Figure 1:
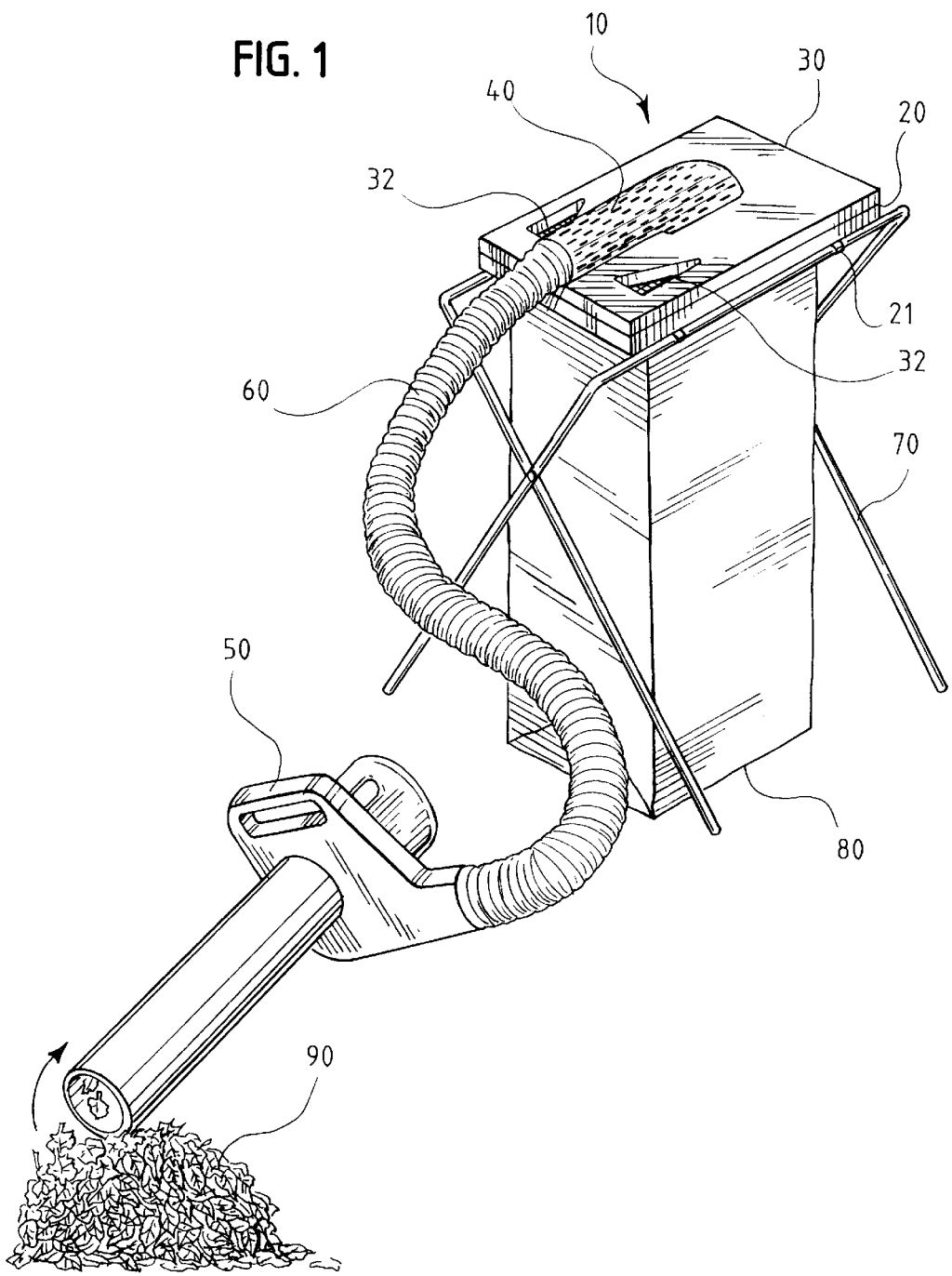
FIG. 1 is a perspective view of a preferred embodiment of the leaf receptacle lid of this invention showing it in use with a lawn blower/vacuum, a bag, and a stand.
Figure 2:
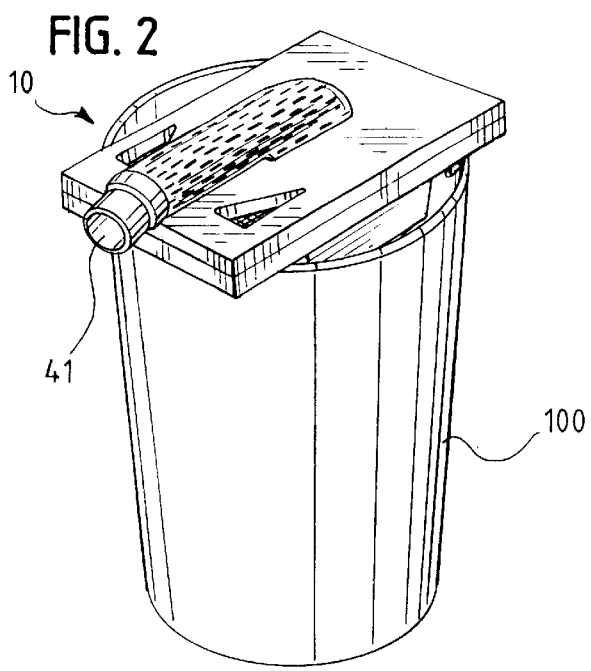
FIG. 2 is a perspective view of the leaf receptacle lid placed onto a rigid can.

This invention is best understood by reference to the drawings. The preferred embodiment of the leaf receptacle lid 10 of this invention comprises an open frame 20, a hinged door 30, and a porous conduit 40. The lid is shown in use connected to a conventional lawn blower/vacuum 50 by a flexible tube 60. The term "lawn blower/vacuum" is used herein to include any device that is capable of transporting leaves by the flow of air. The lid is capable of being used with flexible leaf receptacles, such as disposable bags, and/or with rigid leaf receptacles, such as cans. The first use is illustrated in FIG. 1 where the lid is shown mounted on a stand 70 with a disposable bag 80 slid onto the lid. The lid is shown in use as a pile of leaves 90 is transferred into the disposable bag. The second use is illustrated in FIG. 2 where the lid is shown resting on a garbage can 100 without a disposable bag slid onto the lid. The components are discussed in detail below.

The open frame is the portion of the lid that rests upon a support and that attaches to a disposable bag, if one is used. The frame comprises a vertical chute 21 with an overhanging horizontal top lip 22. The chute portion preferably tapers inwardly from top to bottom. The taper serves two purposes. First, it enables a disposable bag to be more easily inserted onto the chute. Second, it enables the chute portion to fit within cans having a smaller top diameter. The chute is preferably rectangular so that it fits rectangular paper bags. The upper outside dimensions of the chute are preferably about 12 by 16 inches. The overhanging lip is sized and shaped so that it overhangs some or all the collection vessel. For use with rectangular bag receptacles, the overhanging lip is preferably rectangular in shape with dimensions of about 14 by 18 inches. For use with cylindrical can receptacles, the overhanging lip is preferably circular so that gaps, such as those seen in FIG. 2, are not present, especially if disposable bags are not being used. The open frame is preferably made of a rigid and lightweight material such as plastic or wood. Clips 23 are preferably attached to the underside of the overhanging lip to secure the lid to a stand.

The door sits upon the frame and is preferably connected thereto with one or more hinges 31. The hinged connection enables the door to be opened and access easily gained to the inside of the receptacle. The door has an opening into which the porous conduit discharges for receiving the leaves. In the preferred embodiment, the door contains two additional openings 32 that help to vent air from the interior of the receptacle. The openings are preferably covered by a metal mesh or grate. The door is preferably made of the same materials as the frame.

The porous conduit has an inlet 41 adapted to be removably connected to the hose outlet of the blower/vacuum and has an outlet that communicates with the opening in the door. Air and entrained leaves from the blower/vacuum pass through the porous conduit and then into the receptacle. The porous conduit is made of a material that allows air to pass through it but that retains leaves. The preferred material is a nylon industrial ballistic fabric of the type commonly used for lawn mower collection bags. An example of such a fabric is Model 594 fabric, a product of Southern Mills, Inc. of Newnan, Ga., with a weight of 9.5 ounces per square yard and a Frazier air permeability of 767 cubic feet per minute per square foot. In the preferred embodiment shown, the porous conduit is totally porous. However, a rigid conduit having a plurality of openings covered by a porous material is also suitable.

Figure 3:
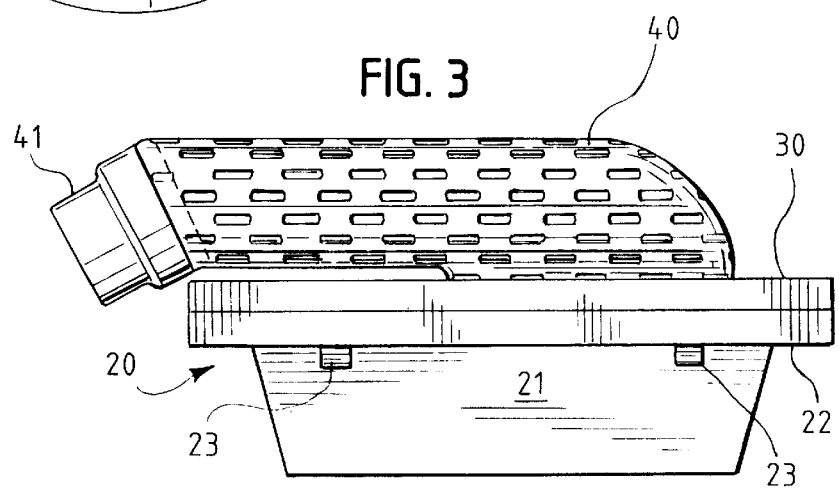
FIG. 3 is a side elevational view of the leaf receptacle lid.
Figure 4:
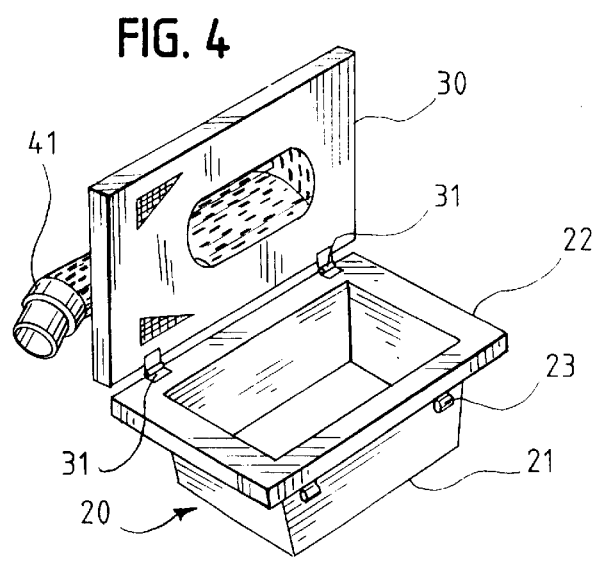
FIG. 4 is a perspective view of the leaf receptacle lid in the open position.

As best seen in FIG. 3, the porous conduit runs parallel to the door for most of its length and then bends at a right angle to enter the door opening. The right angle bend causes a portion of the flowing air entering the conduit to pass out of the conduit before entering the leaf receptacle. Preferably, the inlet to the conduit contains a fixed rigid coupler mounted to the frame at an angle below horizontal, preferably about 45 degrees below horizontal, so the air stream enters the conduit with an upward velocity and even more air escapes before entering the receptacle. The percentage of air passing out of the conduit before entering the leaf receptacle is substantial, although the exact amount depends on the porosity, size, and configuration of the conduit. The reduction of air flow into the leaf receptacle has several beneficial effects. First, it enables leaves to be collected directly into bags without the need for a rigid can, thus eliminating strenuous lifting. Second, it removes the need for a seal between the lid and the receptacle by greatly reducing the amount of the air-entrained particles within the receptacle. And third, it prevents the loss of maximum performance that occurs in a vacuum system when the receptacle becomes increasingly full.

The operation of the leaf receptacle lid can now be considered. First, the lawn blower/vacuum is configured for vacuuming by attaching the inlet suction tube. Second, a non-porous flexible tube, such as clothes dryer vent tubing, is connected between the outlet of the lawn blower/vacuum and the inlet of the porous conduit. The leaf receptacle lid is then placed onto the leaf receptacle. A flexible disposable bag, typically made of paper or other biodegradable material, is slid up onto the chute portion of the lid. There is no need to secure a free-standing bag with straps, bands, or the like because the flow of air into the bag is insufficient to dislodge it. Because a disposable bag cannot support the weight of the leaf receptacle lid, an additional support must be used. A preferred support is a scissoring metal stand as shown in FIG. 1. The stand is made of two members, each of which is shaped like a door frame with two vertical sections and one horizontal section. The two members are pivotably connected at the midpoint of their vertical sections. The stand is lightweight, easily transported from place to place in a yard, and takes up little storage room after being collapsed. Alternatively, the leaf receptacle lid can be supported by a rigid can or the like.

The leaf receptacle lid is versatile and can be used in other ways. For example, it can also be used with a rigid can without a disposable bag. In this case, the lid is simply placed upon the top of the can. As another example, it can be supported on a scissoring metal stand while a rigid can is placed under the lid. In summary, the lid can be used with just a rigid can, with a bag and a rigid can, with a bag and a different support, such as a scissoring metal stand, or with a stand and a rigid can.

Regardless of what type of leaf receptacle is used, the blower/vacuum is then turned on and the inlet suction tube is held near a pile of leaves. The leaves are sucked into the blower/vacuum, discharged through the outlet, pass through the flexible tube, through the porous conduit, and into the receptacle. When the receptacle is full, the inlet of the blower/vacuum is removed from a source of leaves. The blower/vacuum itself may be idled or turned off. If it is desired to compress the leaves in the receptacle, the door is raised, the leaves are compressed, the door is closed, and the blower/vacuum is turned on again. The same procedure is followed if it is desired to add twigs or other larger objects to the receptacle. When the leaf receptacle lid is used with disposable bags and a scissoring metal frame, removal of the bags is especially easy. The lid remains supported by the frame as the filled bag is simply pulled away and replaced with a new bag.

We claim:

1. A leaf receptacle lid for attachment to a hand-held portable lawn blower/vacuum having an inlet for drawing air and leaves into the blower/vacuum and having a hose outlet for discharging the air and leaves into a flexible leaf receptacle, the lid comprising:

(a) an open frame having a vertical chute and an overhanging horizontal lip, the chute adapted to hold a flexible leaf receptacle and the overhanging lip adapted to rest upon a support;

(b) a hinged door connected to the frame, the door having an opening that communicates with the chute; and (c) a porous conduit having an inlet adapted to removably connect to a hose outlet of a blower/vacuum and having an outlet that communicates with the opening in the door.

2. The leaf receptacle lid of claim 1 wherein the porous conduit comprises a porous fabric.

3. The leaf receptacle lid of claim 2 wherein the vertical chute of the open frame tapers inwardly from top to bottom.

4. The leaf receptacle lid of claim 3 wherein the inlet of the porous conduit comprises a fixed rigid coupler mounted to the frame at an angle of about 45 degrees.

5. A leaf receptacle lid for attachment to a hand-held portable lawn blower/vacuum having an inlet for drawing air and leaves into the blower/vacuum and having a hose outlet for discharging the air and leaves into a flexible leaf receptacle, the lid comprising:

(a) an open frame having a vertical chute and an overhanging horizontal lip, the chute adapted to hold a flexible leaf receptacle and the overhanging lip adapted to rest upon a support;

(b) a hinged door connected to the frame, the door having an opening that communicates with the chute; and (c) a porous conduit having an inlet adapted to removably connect to a hose outlet of a blower/vacuum and having an outlet that communicates with the opening in the door, the conduit running substantially parallel to the door and then bending into the door opening so that a portion of the air entering the conduit passes out the conduit before entering the leaf receptacle.

6. The leaf receptacle lid of claim 5 wherein the porous conduit comprises a porous fabric.

7. The leaf receptacle lid of claim 6 wherein the vertical chute of the open frame tapers inwardly from top to bottom.

8. The leaf receptacle lid of claim 7 wherein the inlet of the porous conduit comprises a fixed rigid coupler mounted to the frame at an angle of about 45 degrees.

9. A leaf receptacle apparatus for attachment to a lawn blower/vacuum having an inlet for drawing air and leaves into the blower/vacuum and having a hose outlet for discharging the air and leaves into a flexible leaf receptacle, the apparatus comprising:

(a) a scissoring stand; and (b) a lid comprising:

(i) an open frame having a vertical chute and an overhanging horizontal lip, the chute adapted to hold a flexible leaf receptacle and the overhanging lip adapted to rest upon the support;

(ii) a hinged door connected to the frame, the door having an opening that communicates with the chute; and (iii) a porous conduit having an inlet adapted to removably connect to a hose outlet of a blower/vacuum and having an outlet that communicates with the opening in the door, the conduit running substantially parallel to the door and then bending into the door opening so that a portion of the air entering the conduit passes out the conduit before entering the leaf receptacle.

10. The leaf receptacle apparatus of claim 9 wherein the porous conduit comprises a porous fabric.

11. The leaf receptacle apparatus of claim 10 wherein the vertical chute of the open frame tapers inwardly from top to bottom.

12. The leaf receptacle apparatus of claim 11 wherein the inlet of the porous conduit comprises a fixed rigid coupler mounted to the frame at an angle of about 45 degrees.

* * * * *